April 29, 1952 R. A. MULL 2,594,794
PARALLEL SCREW MACHINIST'S CLAMP
Filed June 25, 1947
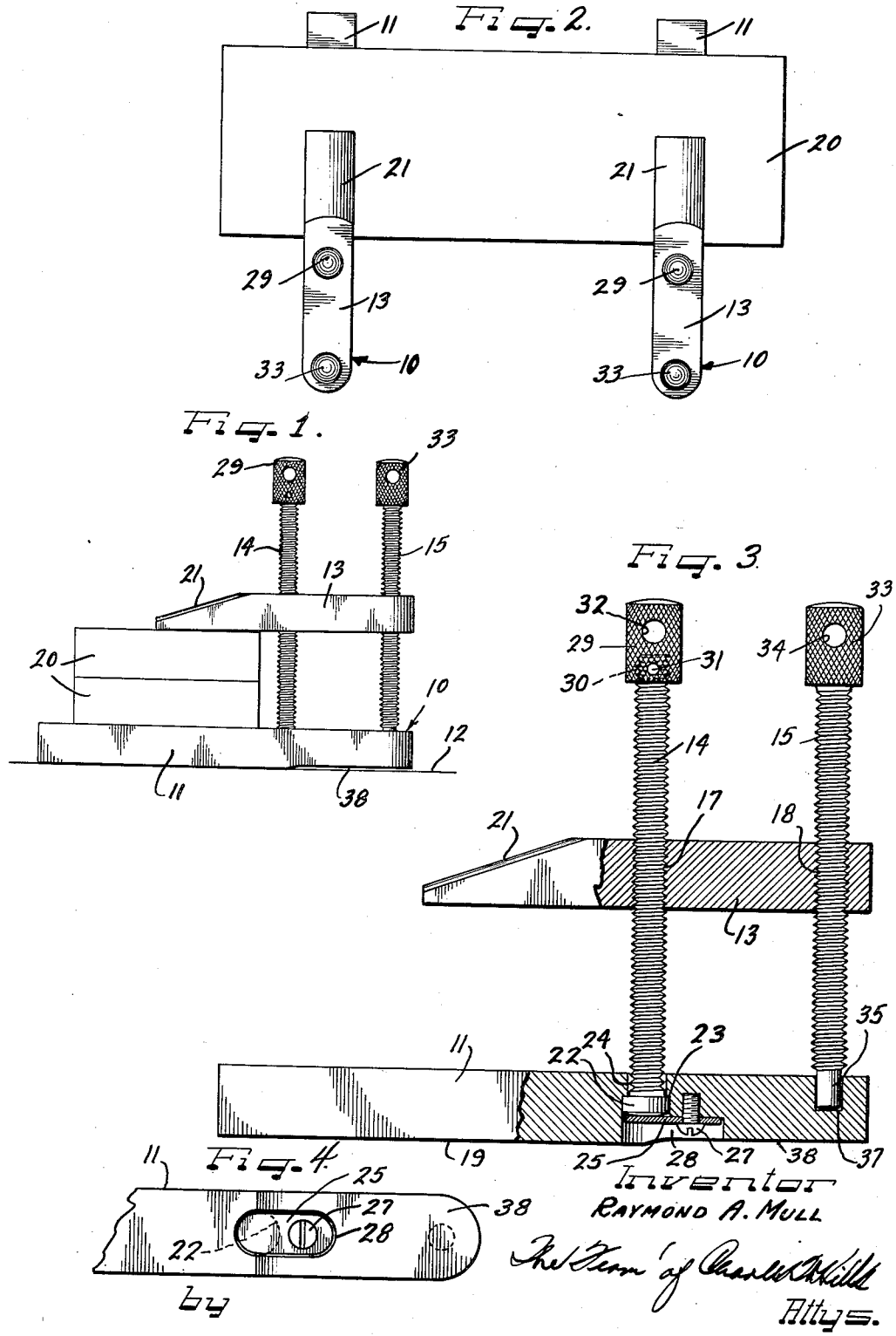
Inventor
RAYMOND A. MULL Patented Apr. 29, 1952

2,594,794

UNITED STATES PATENT OFFICE 2,594,794

PARALLEL SCREW MACHINIST'S CLAMP

Raymond A. Mull, St. Joseph Township, Berrien County, Mich.

Application June 25, 1947, Serial No. 756,965

1 Claim. (Cl. 144—300)

This invention relates to improvements in machinists clamps.

Conventional machinists clamps have parallel clamping bars or jaws and a pair of screws one of which extends freely through one of the bars adjacent to the clamping end thereof and is threaded through the other of the bars adjacent to its clamping end while the remaining screw is threaded through the heel portion of the second bar and is in endwise engagement within a socket in the first bar. The first screw is used for effecting preliminary clamping and the second screw for tightening the clamp.

A very serious disadvantage of prior machinists clamps has resided in that the handle portions of the screws extend in opposite directions from the clamp assembly, that is, one extends from one side of one of the bars and the other extends from the outer side of the other of the bars thereby requiring that the clamp be well elevated above a surface over which it is to be used or that the screw containing portion of the clamp hang over the edge of such surface in order to clear the projecting handle portion of the downwardly extending screw.

An important object of the present invention is to provide a machinists clamp which in use is adapted to rest directly upon a supporting surface without any interference from the clamp screws.

Another object of the invention is to provide a machinists clamp in which the handle portions of both of the screws extend in the same direction beyond the same clamping bar or jaw.

Still another object of the invention is to provide a machinists clamp in which one of the bars can serve as a base directly engageable upon a supporting surface such as a machine table and with the work gripped in the clamp directly in position for machining operation thereon.

A further object is to provide a machinists clamp which in addition to serving as a clamp also is adapted to function as a work support.

A still further object of the invention is to provide a machinists clamp having novel distortion or deflection relief structure.

An additional object of the invention is to provide a novel arrangement of the clamping screws in a machinists clamp.

Other objects, features and advantages of the present invention will be readily apparent from the following detailed description of a preferred embodiment thereof taken in conjunction with the accompanying drawings, in which:

Figure 1 is a side elevational view of a machinists clamp embodying the features of the present invention.

Figure 2 is a top plan view showing a pair of the machinists clamps in use on a work piece.

Figure 3 is an enlarged side elevational view, partially in section, showing certain details of structure of the clamp.

Figure 4 is a fragmentary bottom plan view of the clamp.

A machinists clamp 10 according to the present invention departs radically from conventional machinists clamps by having a base bar 11 which is adapted to rest without obstruction freely upon a surface 12 which may comprise a work table of a metal working machine, or the like. To the attainment of this novel end, an upper clamping bar 13 is clampingly associated with the base bar 11 through the medium of clamp screws 14 and 15 which are threaded through appropriate respective tapped apertures 17 and 18 in the clamp bar 13 and have only their ends associated with the base bar 11. Thereby the screws 14 and 15 extend only beyond the outer side of the clamping bar 13 and the outer side or base face identified at 19 of the base bar 11 is left entirely free to rest directly upon the surface 12 over the entire area of the lower or base surface 19 of the base bar.

By preference the base bar 11 is somewhat longer than the clamping bar 13 so that with the bars in parallelism and with the heel ends thereof disposed generally coplanar, the forward end portion of the base bar 11 extends substantially beyond the end of the clamping bar 13. Thereby a substantial base extension is provided for supporting a workpiece 20 or a pair of workpieces 20 with a full bearing.

The upper or clamping bar 13 may have the jaw end portion thereof beveled as indicated at 21 on its upper or outer surface, in conventional manner.

The clamp screw 14 serves as a runner screw and is disposed adjacent to the clamping jaw portions of the clamp bars 11 and 13, while the screw 15 serves merely as the tightening screw and is disposed adjacent to the heel ends of the bars.

In conventional machinists clamps where the inner or run-down screw extends freely through one of the bars, a shoulder adjacent to the head of the screw engages such bar and serves to draw the bar into clamping engagement. In the present instance, however, the inner screw 14 which serves to run the clamping bars together preliminary to the final tightening, does not extend through the base bar 11 but is freely rotatably retained therein in a novel manner. To this end, the extremity of the screw 14 which is associated with the base bar 11 is formed or otherwise provided with a larger diameter extremity flange 22 which in the assembly is opposed by a counterbore shoulder 23 at the inner end of a bore 24 through which the extremity portion of the screw 14 passes (Fig. 3). The flanged tip of the screw is retained against dropping out of the counterbore by suitable means such as a retainer plate 25 removably secured retainingly across the counterbore as by means of a screw 27, a recess 28 being provided to sink the retainer plate 25 and the screw 27 up within the base bar 11 entirely clear of the base surface 19. Through this arrangement, the retainer plate 25 supports the screw 14 and thereby also the clamping head end of the clamp bar 13 when the same is idle, and when the clamp is in use, the flange 22 of the screw engaging the shoulder 23 draws the base bar 11 into clamping engagement with the clamp bar 13 which is threadedly run toward the base bar by operation of the screw 14.

Where the retainer flange 22 on the screw 14 is formed integrally with its extremity, a manually engageable, preferably knurled head 29 at the opposite extremity of the screw is preferably formed separately and may be provided with a tapped axial bore 30 into which the upper extremity of the screw 14 is threaded and within which it may be pinned against loosening as by means of a drive pin 31. A conventional turn bar transverse hole 32 may be formed in the head 29.

The tightening screw 15 may be of substantially conventional construction and operation. Therefore it has formed at its upper end with a preferably knurled finger engageable head 33 having a turn bar transverse opening 34 therethrough. At its lower end the screw 15 is formed with a non-threaded bearing extremity portion 35 which is freely rotatably received in an upwardly opening socket 37 in the base bar 11.

In the operation of the clamp 10 the bars 11 and 13 are separated by appropriately turning the screw 14 until the work 20 can be received therebetween. Thereafter the screw 14 is turned in reverse to run the clamp bar 13 down onto the work, the screw 15 being thereupon run down through its threaded bore 18 in the bar 13 until the bearing tip 35 drives into the socket 37 and tilts the clamping head of the bar 13 into tight clamping engagement with the work.

Inasmuch as the work is often of necessity clamped quite tightly, there may be a tendency of the clamping bars 11 and 13 to spring at least slightly apart at their heel end portions.

In the upper clamping bar 13 such springing will be of no consequence. However in the base bar 11 downward springing of the heel end thereof would have a tendency to tilt the intermediate portion of the bar, that is the effective clamping portion thereof upwardly and thus throw the work 20 out of true with respect to the surface 12.

In order to avoid any tendency to such possible deviation out of true due to flectional distortion of the base bar 11, the heel end portion thereof is undercut as indicated at 38 to provide a liberal relief or clearance to compensate for any deflectional distortion so that the base bearing surface 19 will at all times remain true and flush with the surface 12. It will be observed that the relief clearance 38 extends from approximately the axis of the preliminary tightening or rundown screw 14 to the heel extremity of the base bar 11, since the deflectional distortion will occur only in the area between the two screws since the screw 14 is pulling the base bar 11 toward the clamping bar 13 while the final tightening screw 15 is pushing the base bar 11 away from the clamping bar 13.

In practice, matching pairs of the clamps 10 are provided wherein the base bars 11 are ground so as to be accurate mates. This means that both the base bearing surfaces 19 and the top work supporting surfaces of the bars 11 of the mated pairs are finished or ground together so that the work 20 will be supported quite accurately parallel to the surface 12 by the base bars 11.

By having the forward ends of the base bars 11 extend substantially beyond the actual clamping portions of the base bars a thorough, complete support is afforded for the work 20. This is well illustrated in Figs. 1 and 2.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In a machinists clamp adapted to be paired with a matched companion clamp to combine the functions of clamp and parallel bar in supporting a work piece with parallel precision upon a machine table, a base bar, a clamping bar, and respective thrust and tension screws threaded through the clamping bar and having their lower ends in freely rotatable operative engagement with the base bar above the lower surface of the base bar and cooperative to effect a clamping interrelationship upon a work piece between the bars, the thrust screw being located in the heel portions of the bars and the tension screw being spaced forwardly from the thrust screw, the base bar in the work-supporting portion thereof forwardly of the tension screw being about twice as long as the portion of the base bar from the tension screw to the heel end of the base bar, said work-supporting portion having the upper and lower surfaces thereof parallel, the lower surface of the base bar from at least the axis of the tension screw and thence rearwardly under the thrust screw to the extremity of the base bar being undercut to clear the same from and avoid contact with the machine table and thus prevent thrust and tension distortions in the screw-engaged portion of the base bar in tightening the bars against a work piece from disturbing the parallel precision of the forward lower surface of the base bar relative to the machine table.

RAYMOND A. MULL.

REFERENCES CITED

The following references are of record in the file of this patent:

UNITED STATES PATENTS

| Number | Name | Date |
|---|---|---|
| 169,027 | Naumann | Oct. 19, 1875 |
| 174,838 | Naumann | Mar. 14, 1876 |
| 893,831 | Adams | July 21, 1908 |
| 922,336 | Rivers | May 18, 1909 |
| 1,214,521 | Dosch | Feb. 6, 1917 |
| 1,713,239 | Parkhurst | May 14, 1929 |